J. DUCKSTINE.
COMPUTING MACHINE.
APPLICATION FILED SEPT. 6, 1916.
1,376,518.
Patented May 3, 1921.
2 SHEETS—SHEET 2.
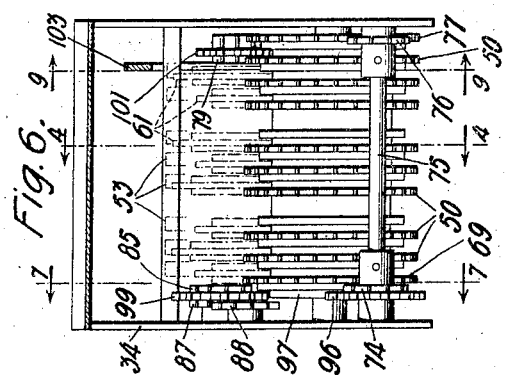
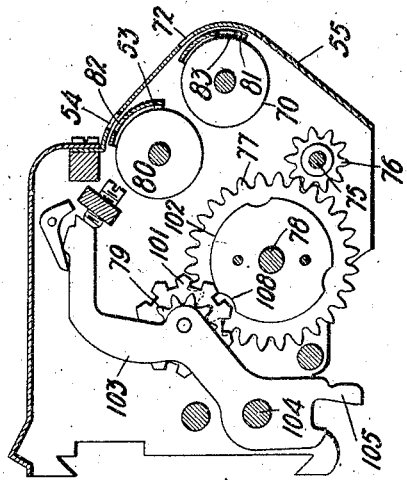
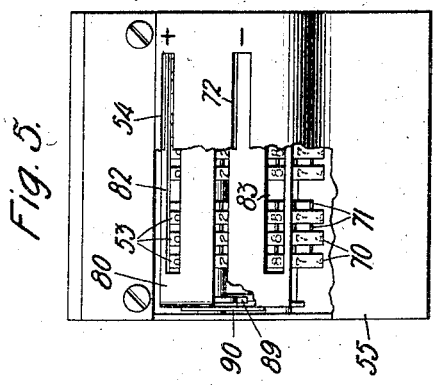
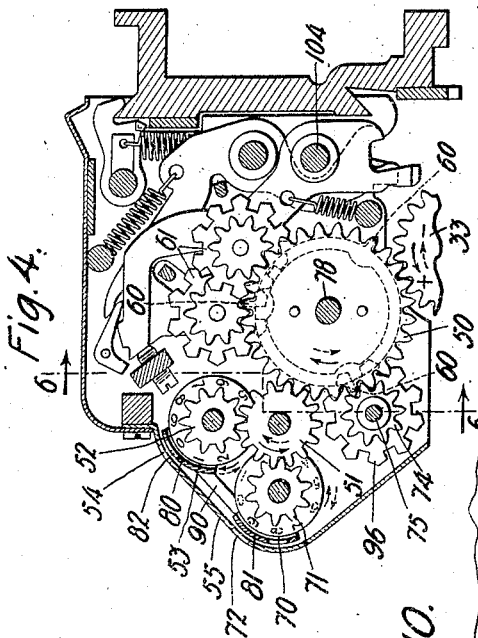
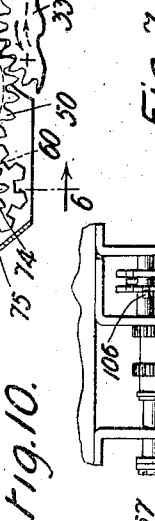
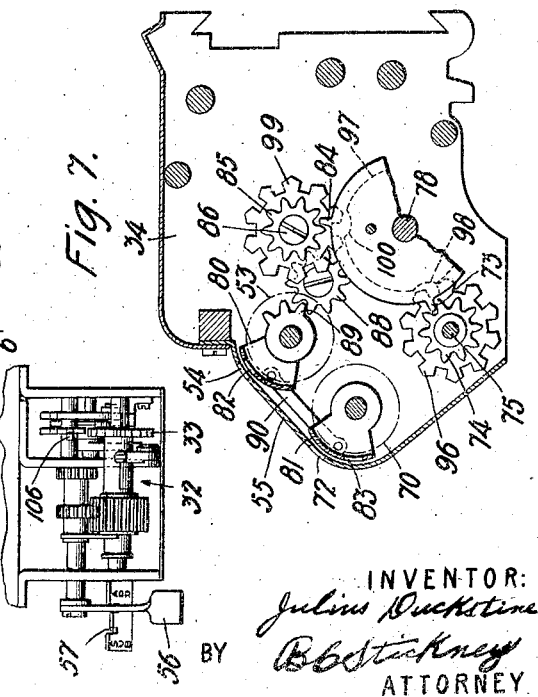
WITNESSES:
John Waldheim
Arthur A. Johnson
INVENTOR:
Julius Duckstine
BY B. C. Stickney
ATTORNEY

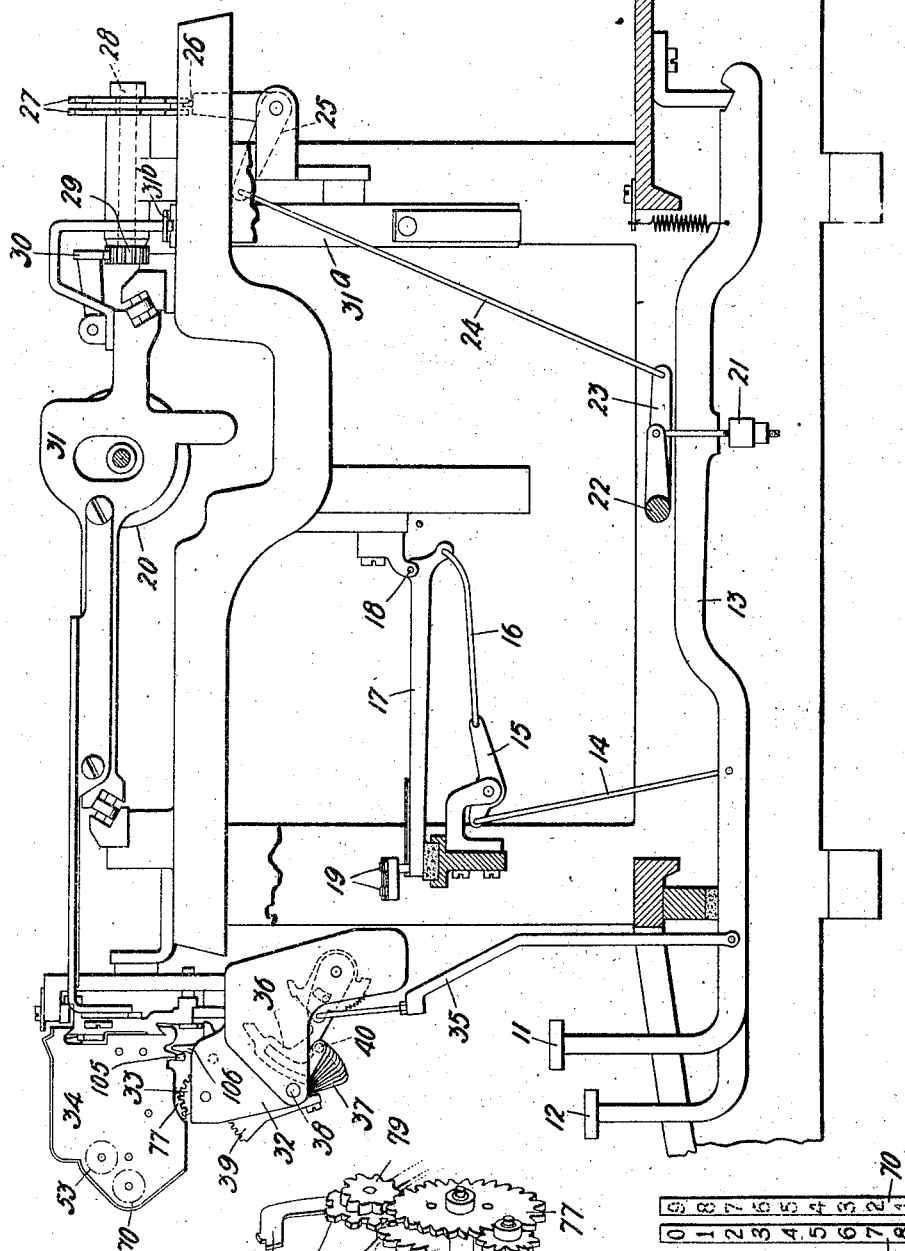

UNITED STATES PATENT OFFICE.

JULIUS DUCKSTINE, OF NEW YORK, N. Y., ASSIGNOR TO UNDERWOOD COMPUTING MACHINE COMPANY, OF NEW YORK, N. Y., A CORPORATION OF NEW YORK.

COMPUTING-MACHINE.

1,376,518.  Specification of Letters Patent.  Patented May 3, 1921.

Application filed September 6, 1916. Serial No. 118,676.

*To all whom it may concern:*

Be it known that I, JULIUS DUCKSTINE, a citizen of the United States, residing in New York, in the county of New York and State of New York, have invented certain new and useful Improvements in Computing-Machines, of which the following is a specification.

My invention relates to a combined typewriting and computing machine adapted to perform addition and subtraction and in which the totalizer is constructed to exhibit results of a negative value upon its dial wheels as well as results of positive value.
My invention may be used in the keeping of accounts, such as bank accounts, and is particularly adapted to exhibit a credit balance preferably in red numerals and distinguished from a debit balance as exhibited in black numerals to show when a depositor has overdrawn his account. As herein disclosed the machine is provided with only one totalizer, but is adapted to be used with a plurality of totalizers, one for each depositor, in bank accounting, for example, or the machine may be provided with one or more totalizers for the purpose of business accounting to show correct credit and debit balances.
The totalizer of this machine is of a construction similar to the standard Wahl totalizer as shown in patent to Wahl No. 1,148,733 and as disclosed herein is provided with an extra set of dial wheels to exhibit negative quantities and is also provided with a shutter mechanism whereby only one set of figures, either positive or negative, may be read at a time through one of two sight openings, one for each set of dial wheels.
The totalizer is also provided with mechanism to actuate said shutters when a greater number of positive value is subtracted from a number of lesser positive value or when a greater number of positive value is added to a number of lesser negative value.

In a machine of this type it is necessary when computation is being performed in any denomination higher than units, to perform tens-carrying from the dial wheel of highest denomination to the units dial wheel whenever the dial wheel of highest denomination is rotated so that it moves from 9 to 0 as seen at the sight opening or vice versa. For this purpose there is connected to the dial wheel of highest denomination by suitable gearing a back gear mechanism which is adapted to transmit motion from said wheel of highest denomination, through the intermediary of gearing, to the dial wheel of units denomination.

It is one of the objects of the present invention to provide a totalizer having two sets of dial wheels for representing numbers of different character, the wheels of both sets being controlled in common by a single set of computing wheels having tens-carrying mechanism independent of either of said sets of dial wheels, but affecting the operation of both alike.

Another object of the invention is to include, in the back gearing, or mechanism for effecting tens-carrying operations from the computing wheel of highest denominational order to that of lowest denominational order, means automatically effective to prevent overthrow of the wheel of lowest denominational order at the end of such a carrying operation, and for maintaining a lock to prevent accidental displacement of that wheel, without adding resistance to the rotation of said wheel during a carry.

Another object of the invention is to provide locking mechanism for the back gearing and locking mechanism for the number wheel of lowest order, said locking mechanisms being so related that the lock for the number wheel may be rendered ineffective, during a computing operation calling for a direct rotation of that wheel, without interfering with the effectiveness of the locking mechanism for the back gearing.

Another object of the invention is to provide a totalizer having a series of computing wheels, one for each denominational order, and a series of transfer elements for effecting tens-carrying operations from each computing wheel of lower denominational order to the computing wheel of next higher denominational order, and from the computing wheel of highest denominational order to the computing wheel of lowest denominational order, said transfer elements including automatic overthrow-preventing and locking means, and certain of said transfer elements being movably mounted, so that the element for effecting a carry to the wheel of any denominational order, and which normally locks the same, may be moved during a computing operation calling for a direct rotation of the wheel of that order.

Another object of the invention is to provide the shutters for the dial wheels with operating mechanism controlled by the computing wheel of highest denominational order, and for locking the same against overthrow and accidental displacement, without interfering with the rotation of said computing wheel of highest denominational order in either direction to the full capacity of the mechanism.

Other features and advantages will hereinafter appear.

In the accompanying drawings;

Figure 1 is a general sectional side view of the combined typewriting and computing machine.

Fig. 2 is a fragmentary skeleton perspective view of the gearing employed to drive the units wheel from the wheel of highest denomination.

Fig. 3 is a development of the dial wheel peripheries showing the relative arrangement of the red and black numerals.

Fig. 4 is a sectional view of the totalizer taken on the line 4—4 of Fig. 6.

Fig. 5 is a front view of the totalizer with a portion of the casing broken away to show the underlying structure.

Fig. 6 is a sectional view of a portion of the totalizer taken on the line 6—6 of Fig. 4, some of the parts being omitted.

Fig. 7 is a fragmentary sectional side view of the totalizer taken on the line 7—7 of Fig. 6, showing the position of the parts when a positive result is shown in the totalizer.

Fig. 8 is a view similar to Fig. 7 showing the parts in the positions assumed when a negative result is shown in the totalizer.

Fig. 9 is a sectional view taken on the line 9—9 of Fig. 6 showing the portion of the gearing associated with the units dial wheel through which motion is transmitted thereto from the dial wheel of highest denomination, the positions of the parts being such as to correspond to a positive value in the totalizer.

Fig. 10 is a fragmentary top plan view of the master wheel and adjacent mechanism.

Numeral keys 11 and alphabet keys 12 are depressed to swing key levers 13 to draw downwardly links 14 to swing bell-cranks 15 and draw forwardly links 16 to swing type bars 17 about their pivots 18 so that type 19 will be swung upwardly and rearwardly against a platen 20 to print upon a work sheet wound around said platen.

In order that the platen may be moved one letter space in letter feeding direction at each depression of the keys 11 and 12, there is provided a universal bar 21 underlying all of the key levers 13, which when depressed move said bar and therewith swings a rock shaft 22 and an arm 23 fast thereto to pull on a link 24 connected at its upper end to an arm 25 to actuate an escapement dog 26 coöperating with escapement ratchet wheels 27 mounted on a shaft 28 journaled in the frame work of the typewriter, and which has fast thereto at its forward end, a pinion 29 normally meshing with a rack 30 mounted on a typewriter carriage 31 to move one letter space from left to right under the power of a spring-drum 31$^a$ connected to the typewriter carriage by a draw-band 31$^b$ at the actuation of said dog and escapement wheels. The typewriting mechanism herein described is common to typewriters of the Remington visible type.

Attached to the front of the typewriter frame is a computing mechanism 32 including a master wheel 33 rotatable in either direction for addition and subtraction respectively, and is adapted to mesh with the gear wheels of a totalizer or computing head 34, mounted at the front of the typewriter carriage 31, to rotate said gear wheels additively or subtractively, starting with the highest denominational element of the totalizer and so on to the lowest, as the carriage travels in letter feeding direction to register on the dial wheels of the totalizer the result of the computation performed on the machine. For this purpose, each numeral key 11 has connected thereto an upwardly extending link 35 (Fig. 1) connected to swing a cam arm 36 at the depression of a numeral key and adapted to swing arms 37 fast on a rock shaft 38 journaled in the frame work of the computing mechanism, said rock shaft swinging therewith a gear segment 39 which, at said depression of a numeral key is adapted to swing a distance directly proportional to the digital value of the numeral key depressed in a manner illustrated and described in patent of John C. Wahl, No. 893,719.

It will be noted that the angular motion of all the arms 36 is equal, but that the associated arms 37 are arranged spirally or differentially so that the wrists 40 thereon will come in engagement with the arms 36 during the earlier or later part of the actuation of the latter at the depression of a numeral key so that a variable amount of motion will be transmitted to the segment 39 at the depression of the different numeral keys. It will also be noted by an inspection of Fig. 10, that the computing mechanism 32 is provided with a state controlling handle adapted to operate a reversing gear to determine the direction of rotation of the master wheel 33, as in said patent to Wahl No. 1,148,733.

In order to transmit the digital rotation of the master wheel or driving means 33 to the dial wheels of the totalizer 34, the latter is provided with computing wheels or intermediate elements 50, one for each domination and so placed on said totalizer as to be moved into mesh *seriatim* with the master wheel, when the typewriter carriage is moved in a computing zone at each step of the letter feed movement of said carriage. In mesh with each computing wheel 50, is an idle or intermediate pinion 51, meshing with a pinion 52 fast on a dial wheel 53; there being as many dial wheels or numeral wheels 53, as there are computing wheels 50. Each dial wheel 53 has the numerals "0" to "9" inclusive, arranged equidistantly on its periphery, one of which on each dial wheel is adapted to be visible at a sight opening 54 formed in the front wall 55 of the totalizer casing. The gearing of the computing wheel 50 and pinions 51 and 52, are so proportioned relative to the master wheel, as to cause a one digit rotation of the dial wheel 53 for every one digit rotation of the master wheel 33.

As herein disclosed, when the state control handle is moved to adding position, Fig. 10, the gearing of the master wheel mechanism is so set as to rotate the master wheel in a counter-clockwise direction, as indicated by full line arrow in Fig. 4, and through the intermediary of the gears 50, 51 and 52 rotate the dial wheels 53 in clockwise direction so that the numerals thereon will appear at the sight opening 54 in arithmetical progression from "0" to "9" for every revolution of the dial wheel to perform addition.

When it is desired to perform subtraction, the handle 56 Fig. 10, is moved into engagement with the notch 57 marked for subtraction to so set the gearing of the master wheel mechanism 32 as to cause a clockwise rotation of the master wheel 33, as indicated by the dotted arrow in Fig. 4, at the actuation of the numeral keys 11 to rotate the dial wheels 53 in counter-clockwise direction for subtraction.

Whenever the numeral "9" on the dial wheel 53, passes the sight opening 54 in addition direction, or when the numeral "0" thereon passes said sight opening in subtraction direction, it is desirable to rotate the dial wheel of next higher denomination one digit's distance in the same direction of rotation as that of said dial wheel on which said "9" or "0" has passed the sight opening, to perform what is commonly known as a carry-over action. For this purpose, each computing wheel 50 is provided with a carry-over tooth 60 adapted to coöperate with a Geneva lock carry-over pinion 61, so placed relative to the carry-over tooth 60 and the numerals on the associated dial wheel 53, so that when said "9" or "0" thereon is at the sight opening, said tooth 60 will lie in proximity to the associated pinion 61 so as to actuate the latter at the rotation of said dial wheel 53. The carry-over pinion 61 has gear teeth formed thereon adapted to mesh with the gear wheel of the computing wheel 50 of next higher denomination to transmit a one digit's rotation thereto at the actuation of said carry-over pinion 61 through the intermediary of said tooth 60.

It will be noted that each computing wheel 50 as herein disclosed, is provided with three of the carry-over teeth 60 since the dial wheel 53 is so proportioned as to make three complete revolutions for every revolution of the associated computing wheel 50 and since there is associated with each computing wheel 50 only one carry-over pinion 61. Said carry-over pinions 61 are normally in mesh with their respective computing wheels 50 and are moved out of mesh with said wheels one at a time, at the depression of a numeral key 11, only the pinion 61 associated with the computing wheel which is in mesh with the master wheel being thus moved out of mesh in order that said computing wheel and associated parts may be rotated by the master wheel, there being mechanism provided to swing said pinion 61 out of mesh in a manner illustrated and described in said patent of Wahl No. 1, 148,733.

When it is desired to subtract a greater number from a lesser number, as 6000.00 dollars from 5100.00 dollars for example, the dial wheel 53 of the thousand-dollar order will be rotated a six digit distance in counter-clockwise direction at the depression of the "6" numeral key, to bring the numeral "9" on said dial wheel to the sight opening 54. When said dial wheel passes from "0" to "9," it will cause a carry-over action to take place on the wheel of next higher denomination, which standing at "0" will be moved to "9" and will, in turn, cause a carry-over action to take place, and so on to the wheel of highest denomination, so that the three wheels of highest denomination, there being eight shown on the totalizer disclosed herein, would read 999,100.00, which is an erroneous result. It will be noted that the correct difference or overdraft of the computation cited in this example is 900.00 dollars. In order that the totalizer may exhibit this correct result, there are provided dial wheels or numeral wheels 70 as many in number as there are dial wheels 53, said dial wheels 70 having fast thereto dial-wheel pinions 71, which mesh with the idle pinions 51, so that said dial wheels 70 will be rotated simultaneously with the dial wheels 53, and equal angular distances in a denomination.

The dial wheels 70 are provided with numerals on their periphery from "0" to "9" inclusive, and preferably of a different color than the numerals on the dial wheels 53, or otherwise distinguished therefrom, and are so placed on the periphery of said dial wheels 70 as to exhibit the complement at a sight opening 72 of the numeral exhibited at the sight opening 54 in the same denomination, said complement being based on the numeral "9", that is, the complement of "9" will be "0", the complement of "8" will be "1", and so on. The numerals on the dial wheels 70 are arranged to appear in arithmetical progression at the sight opening when said dial wheels rotate in counter-clockwise direction, as seen in Fig. 4, so that the complement of any number on the dial wheel 53, appearing at the sight opening 54, will always stand at the sight opening 72, and vice versa. If, in the example cited, the complemental numbers of the digits in the result are now read at the sight opening 72, there would appear the number 000,899.99, which is still an erroneous result.

As is well known in algebraic summations of this character, it is necessary to perform a carrying action from the dial wheel of highest denomination to that of lowest denomination when said wheel of highest denomination passes from "9" to "0", or vice versa. For this purpose, there is provided on a wheel 669 adjacent to and concentric with the computing wheel 50 of highest denomination, a carry-over tooth 73, adapted to engage and rotate a pinion 74 fast on a shaft 75 (Figs. 6 and 7) at the other end of which is fast a pinion 76 (Figs. 6 and 9), constantly in mesh with a gear wheel 77 loosely and rotatably mounted on a shaft 78 concentric with the computing wheels 50 and adapted to be rotated a one digit distance when the carry-over tooth 73 actuates the pinion 74 and connected parts simultaneously with the passing of "9" or "0" at the sight opening of the dial wheel of highest denomination. It will be noted that the gear wheels 69 and 77 are two additional gear wheels on shaft 78; they are similar to wheels 50 and arranged one at each side of the series of gear wheels 50.

In order to transmit said one digit distance rotation of the gear wheel 77 to the dial wheel of lowest denomination, there is provided a carry-over pinion 79 having two identical gears separated by a Geneva pinion 101, one of said gears normally in mesh with said gear wheel and the other gear normally in mesh with the computing wheel 50 associated with the dial wheel of lowest denomination. The pinion 79 is so placed with respect to said computing wheel 50 and the gear wheel 77 as to transmit an equal angular rotation from the latter to the former, which, through the intermediary of its associated pinions 51, 52 and 71, will transmit a one digit rotation to the dial wheels 53 and 70 of lowest denomination.

It will now be seen, referring to the herein-mentioned example of computation that as the dial wheel 53 of highest denomination moves from "0" to "9" at the sight opening 54, a carrying action will take place to rotate the dial wheel of lowest denomination a one digit distance, so that the dial wheel 70 of units denomination will be rotated in counter-clockwise direction, to move the numeral "0" thereon to the sight opening instead of the numeral "9", as indicated in the last-mentioned result. When said dial wheel 70 of lowest denomination is thus moved from "9" to "0", a carry-over action takes place therefrom to the wheel of next higher denomination, which, also standing at "9", will cause a carrying action to take place therefrom, and so on to the dial wheel 70, exhibiting the numeral "8" in said last-mentioned result, to move the latter to "9", so that the reading on the dial wheels will be 000,900.00, or 900.00 dollars, which is the correct result.

It will be noted that at the time the dial wheels 70 are in such positions that the numerals 000,900.00 stand at the sight opening 72, the complements of said digits, namely, 999,099.99 will be at the sight opening 54 on the dial wheels 53.

In order that the units of cents computing wheel 50 may be operated by the master wheel, it is advantageous to disengage the carry-over pinion 79 therefrom so that the Geneva lock 101, 102 will be rendered ineffective to prevent the rotation of said computing wheel and associated parts. For this purpose, the carry-over pinion 79 is mounted on an arm 103 pivoted at 104, and having an extension 105, adapted to coöperate with an arm 106, Fig. 1, which is swung forwardly during the initial part of the down stroke of any numeral key to actuate the arm 103 prior to the rotation of the master wheel in said denomination so as to move the carry-over pinion 79 out of engagement with its associated parts in a similar manner to the disengagement of the carry-over pinions 61 by the actuation of the arm 106 as illustrated and described in said patent to Wahl No. 1,148,733.

It will be noted that no carry-over action took place from the dial wheel of hundreds of dollars denomination to the dial wheel of the thousand of dollars denomination during the computation involved in the example cited above. If, however, the nature of the computation should require a carry-over action from the dial wheel of next lower denomination to the dial wheel being actuated by the master wheel in an algebraic summation, said carry-over action will take place simultaneously with the rotation of said dial wheel by the master wheel at which time the carry-over action, will be ineffective to rotate said dial wheel associated with the master wheel an extra digit's distance, since said master wheel rotates an amount directly proportional to the numeral key depressed and thus limits the amount of rotation of the connected dial wheel and simultaneously effects all carry-over actions which may take place during the involved computation. It will be noted that no carry-over action can take place after the master wheel has ceased to rotate and therefore said extra digit's rotation of the actuated wheel required to bring about the correct result cannot take place. Such a condition arises in case it is desired for example to subtract 6000.00 dollars when the dial wheels 53 exhibit 5000.00 dollars. It will be evident from the foregoing that when the "6" numeral key is depressed to actuate the dial wheels of thousands of dollars denomination, that the wheel 53 will be rotated in counter-clockwise direction a "6" digit's distance to bring the numeral "9" to the sight opening and to cause a carry-over action to take place to the wheel of highest denomination and therefrom through the intermediary of the back gearing 74, 75, 76 and connected parts, cause a carry-over action to take place onto the units of cents denomination and so on to the dial wheel of hundreds of dollars denomination which will pass from "0" to "9" and to rotate its associated carry-over pinion 61 which will rotate simultaneously with the rotation of the thousands of dollars computing wheel 50, during the time that the latter is being rotated by the master wheel a distance directly proportional to the value of the numeral key so that said thousands of dollars dial wheel 53 will move so that the numeral "9" thereon will be at the sight opening 54.

If at this time the reading of the dial wheels 70 at the sight opening 72 is noted, it will be seen that the latter exhibit the complements of the numerals at the sight opening 54 and will read 000,000.00 in red figures. This, however, is an erroneous result since the difference in the example cited is 1000.00 dollars.

In order to correct this result it is necessary to rotate the dial wheel of thousands of dollars denomination one digit distance, after the master wheel has ceased rotating by the depression of the "6" numeral key, which is readily done by back-spacing the typewriter carriage 31 one letter-space distance and depressing the "1" numeral key to rotate the thousands of dollars dial wheel said one digit distance so that the reading of said dial wheels 70 will be 1000.00 dollars, which is the correct result.

The above-mentioned ineffectual carry action takes place in any computation in which a carry-over action onto the dial wheel being actuated by the master wheel is required.

In order to prevent the confusion of the operative by two sets of numerals namely; black and red appearing at the sight openings 54 and 72 respectively, there is provided shields or shutters 80 and 81, one for each set of dial wheels (Figs. 4, 5, 7, 8 and 9) pivotally mounted on the respective dial wheel shafts and so formed as to obstruct vision through one of the sight openings 54 or 72 at a time.

In order that the black or positive numerals may be read through the sight opening 54 there is provided in the shutter 80 a sight opening 82 which when moved to effective position coincides with the sight opening 54 so that the numerals on the dial wheels 53 may be read therethrough. The shutter 81 is likewise provided with a sight opening 83 adapted to be moved into coincident position with the sight opening 72 as will presently appear so that the red or negative numerals on the dial wheels 70 may be read therethrough.

The sight openings 54 and 82 are normally coincident as seen in Figs. 4 and 7 so that positive numerals may be read therethrough and remain coincident during any computation which does not involve an overdraft, that is, the subtraction of a greater positive number from a lesser positive number. When, however, a computation is performed beginning with a positive number at the sight opening the result of which is a negative quantity, it is advantageous to prevent the reading of the positive numerals on the dial wheels 53 and to expose the negative numerals on the dial wheels 70. For this purpose there is provided, on a disk attached to the wheel 69 which is rotatably mounted on the shaft 78 adjacent to the computing wheel 50 of highest denomination, a tooth 84 adapted to engage a pinion 85 pivoted at 86 (Fig. 7) to the left side wall of the totalizer 34 (Fig. 6) and secured to said pinion 85, so as to rotate therewith is a gear wheel 87 meshing with an idle pinion 88 also pivoted to said side wall and in mesh with a segment 89 (Figs. 7 and 8) formed on the shutter 80 and so placed relative to the sight opening 82 therein and to the tooth 84 that when the dial wheel of highest denomination passes from "0" to "9" at the sight opening 54, the tooth 84 will be rotated through the intermediary of the carry-over pinion 61 associated with the dial of highest denomination to actuate the gears 85, 87 and 88 to swing the shutter 80 from its normal Fig. 7 position to the Fig. 8 position so as to move the sight opening formed therein out of coincidence with the sight opening 54, thus obstructing the view of the positive numerals on said dial wheels through the sight opening 54.

In order that the negative numerals of the dial wheel 70 may be exposed to view simultaneously with the obstruction from view of the positive numerals there is provided a link 90 pivotally mounted on and connecting the shutters 80 and 81 so that when the shutter 80 and the sight opening 82 therein is moved out of coincidence with the sight opening 54, the sight opening 83 will be moved into coincidence with the sight opening 72 so that the negative numerals may be read therethrough; said sight openings 82 and 83 being so placed relatively to each other and to the sight openings 54 and 72 that one or the other of said set of dial wheels may be read at a time depending on whether a number was subtracted from a lesser positive number, or a greater positive number was added to a lesser negative number.

After the shutters 80 and 81 have been moved to the Fig. 8 position to exhibit negative numbers and a greater number than appears in the sight opening 72 is added, the dial wheel of highest denomination will be moved during said computation to effect a carry-over action and to cause the tooth 84 on the disk attached to the wheel 69 to actuate the gear associated with the shutter 80 to move the latter and the shutter 81 connected thereto from the Fig. 8 position to the Fig. 7 position so that black or positive numerals will appear at the sight opening 54 and to obstruct the vision of negative or red numerals at the sight opening 72.

The operative may easily ascertain during the actuation of any dial wheel by the master wheel, when said dial wheel is to be rotated an additional digit's distance by the "1" numeral key in an algebraic computation, by observing the dial wheels of the totalizer. It will be seen that, whenever a dial wheel other than that of units of cents denomination is actuated said additional digit's rotation of the dial wheel being actuated is required, if, before said actuation of said dial wheel, all the dial wheels at the right thereof stand at "0," and if, subsequent to said actuation, the dial wheel numerals of different color appear at the sight opening. When, however, computation is taking place in units of cents denomination, and if, during computation in said denomination, numerals of a different color appear at the sight opening, it is necessary to rotate said units of cents dial wheel an additional digit's distance, said rotation in each case being in the same direction as that in which said dial wheels rotated during said computation.

It will be evident from the above, that it is an easy matter for the operative to determine when to actuate a dial wheel, said additional digit's distance, and it will also be evident that it is not incumbent upon the operative to perform any mental computations whatever to obtain the correct result, but merely requires observation of some of the dial wheels.

In order to prevent overthrow and accidental rotation of the back gearing 74, 75, 76 and connected parts, there is provided fast on the shaft 75 and preferably formed in a unit with the gear wheel 74, a Geneva lock member 96 coöperating with the periphery 97 of a disk attached to the wheel 69, to hold said Geneva member or wheel 96 against rotation. When, however, the tooth 73 actuates the associated gear wheel 74, a notch 98, formed in said disk, is moved into position to permit free movement of a tooth of the Geneva lock member 96 so that the latter may rotate bodily with the pinion 74 until said pinion has completed a one digit's distance of rotation at which time the periphery 97 will again move into engagement with the teeth of the Geneva member 96 to arrest the motion of the gear wheels 74 and connected parts, thus preventing overthrow of the units dial wheel, and hold said parts against accidental rotation.

To prevent overthrow and accidental actuation of the shutters 80 and 81, there is provided fast on the gear wheel 85 a Geneva lock member 99, also coöperating with the periphery 97 which has provided thereon a notch 100 similar to the notch 98 and used for a similar purpose, the parts being so arranged that as the tooth 84 completes the actuation of the gear wheel 85, the Geneva member 99 coöperating with the periphery 97, will prevent overthrow of said shutters and hold the same against displacement.

To prevent over rotation of the units dial wheel after motion has been transmitted thereto through said back gearing, the carry-over pinion 79 associated therewith, is provided with a Geneva lock member 101 normally in engagement with a periphery 102 having a notch 103 cut therein, and so placed relative to said Geneva lock member 101 as to permit the rotation thereof during a carry-over action; but to hold said wheel against further rotation in the same direction at the completion of said carry-over action, and thereby prevent overthrow of the units of cents dial wheel associated with said carry-over pinion 79 and to tend to hold said dial wheel against accidental displacement.

It should be understood that wheel 69 is given a single-step movement in one direction or the other accordingly as the wheel 50 of highest denomination shifts the corresponding positive dial wheel from "0" to "9" or from "9" to "0" to indicate a change from a positive to a negative result, or vice versa. As long as the results of the computation are positive, the parts will remain in the positions shown in Fig. 7, and obviously Geneva member 96 is locked against movement in the positive (counter-clockwise) direction, but not against movement in the opposite or negative direction. When, however, the result in the totalizer becomes negative, the parts are shifted to the position shown in Fig. 8, the Geneva member 96 being locked against further movement in the clockwise direction but free to move in the opposite or positive direction. Inasmuch as pinions 74 and 76 are of the same size and the same relation exists between gear-wheels 69 and 77, a single-step movement of wheel 69 in either direction will cause a corresponding movement of wheel 77. As indicated in Fig. 6, the views in Figs. 7 and 9 are obtained by looking in opposite directions, so in Fig. 9 the positive rotation about shaft 78 is in the counter-clockwise direction, and the Geneva wheel or member 101 prevents further positive rotation of gear 77, but does not interfere in any way with a single-step movement in the opposite direction as the result in the totalizer changes from positive to negative. A similar result would be obtained in changing from negative to positive results.

Inasmuch as the movement of the elements in the train for carrying over from the computing wheel 50 of highest denomination to that of lowest denomination in passing through zero in either direction, is so slight, it would be unnecessary to make them as complete wheels or disks. The present forms are, however, convenient to manufacture, due to the fact that some of them are substantially identical with parts used in the totalizer proper, and perform their functions equally well when in several different positions, thus rendering it easier to assemble the parts and enabling them to be shifted when the contacting parts become worn.

It will be noted by reference to Figs. 4, 7 and 9, that the Geneva lock wheels 96, 9ƥ and 101 are of similar construction to those included in the carry-over pinions 61, but that the former may be on a different structure than those of the carry-over pinions 61 to perform the functions herein disclosed.

Variations may be resorted to within the scope of the invention, and portions of the improvements may be used without others.

Having thus described my invention, I claim:

1. A totalizer comprising, in combination, a series of wheels representing different denominational orders, tens-carrying mechanism therefor, includnig a gear adjacent the wheel of lowest denominational order, back gearing for effecting a carry from the wheel of highest denominational order to said gear, a transfer member, including an automatic lock and overthrow-preventing device, for transmitting rotative movement from said gear to the wheel of lowest denominational order, and for preventing accidental displacement thereof, and menas for rendering said transfer member ineffective during a computing operation involving a direct rotation of said wheel of lowest denominational order.

2. A totalizer comprising, in combination, a series of wheels representing different denominational orders, and tens-carrying mechanism therefor, including a gear wheel adjacent the wheel of lowest denominational order, back gearing, including a Geneva-locking device, for transmitting rotative movement from the wheel of highest denominational order to said gear wheel, and a transfer element, including a Geneva-locking device, for imparting rotative movement from said gear wheel to the wheel of lowest denominational order, said transfer element being movable to an ineffective position, to permit free movement of the numeral wheel of lowest denominational order during a computing operation involving a direct rotation of that wheel, without interfering with the effectiveness of the locking device in the back gearing.

3. A totalizer comprising, in combination, a series of wheels representing different denominational orders, and tens-carrying mechanism therefor, including a gear wheel adjacent the wheel of lowest denominational order, and back gearing including a Geneva-locking device for effecting a carry through said gear from the wheel of highest denominational order to the wheel of lowest denominational order.

4. A totalizer comprising, in combination, a series of wheels representing different denominational orders, tens-carrying mechanism therefor, including a gear adjacent the wheel of highest denominational order, a gear adjacent the wheel of lowest denominational order, means, including a Geneva-locking device, for transmitting rotative movement from the wheel of highest denominational order through the gear adjacent thereto to the gear adjacent the wheel of lowest denominational oder, means, including a Geneva-locking device for transmitting motion from said last-mentioned gear to the wheel of lowest denominational order, and means for removing the last-mentioned lock without rendering the first-mentioned lock ineffective.

5. A totalizer comprising, in combination, a series of wheels representing different denominational orders, and tens-carrying mechanism therefor, including two gear wheels, one at each side of said series of wheels, means for effecting a carry from the wheel of highest denominational order to the adjacent gear wheel, and menas, including a Geneva-locking device, for transmitting rotative movement from the last-mentioned gear wheel through the other to the wheel of lowest denominational order in said series.

6. A totalizer comprising, in combination, a series of wheels representing different denominational orders, and tens-carrying mechanism therefor, including two gear wheels, one at each side of said series of wheels, and means, including a Geneva-locking device, for transmitting rotative movement from the wheel of highest denominational order, to and through said gear wheels, to the wheel of lowest denominational order of said series, the element of said transmitting means between said wheel of lowest denominational order and the adjacent gear wheel being movable to an ineffective position to permit said wheel to be rotated independently thereof during a computing operation.

7. A totalizer comprising, in combination, a series of wheels representing different denominational orders, and tens-carrying mechanism therefor, including two gear wheels, one at each side of said series of wheels, and means, including a Geneva-locking device, for transmitting rotative movement from the wheel of highest denominational order through said gear wheels, to the wheel of lowest denominational order, to effect a carry from the wheel of highest to that of lowest denominational order.

8. A totalizer comprising, in combination, a series of computing wheels one for each denominational order, and tens-carrying mechanism therefor, including two gear wheels, one at each side of said series of computing wheels, means, including a Geneva-locking device, for connecting said gear wheels with each other, and means for transmitting rotative motion from the computing wheel of highest denominational order to one of said gear wheels, and from the other gear wheel to the computing wheel of lowest denominational order, to effect a carry from the computing wheel of highest to that of lowest denominational order.

9. A totalizer comprising, in combination, a series of computing wheels, one for each denominational order, and tens-carrying mechanism therefor, including two gear wheels, one at each side of said series of computing wheels, means, including a Geneva-lock device, for connecting said gear wheels with each other, means, including a Geneva-lock device for connecting the computing wheel of highest denominational order with one of said gear wheels, and means, including a Geneva-lock device, for connecting the other gear wheel with the computing wheel of lowest denominational order.

10. A totalizer comprising, in combination, a set of computing wheels representing different denominational orders, tens-carrying mechanism, including a gear wheel adjacent the computing wheel of highest denominational order, and means for transmitting rotative motion from said computing wheel, to and through said gear wheel, to the computing wheel of lowest denominational order, to effect a carry from the computing wheel of highest to that of lowest denominational order, means controlled by said computing wheels for representing numbers in one or the other of two different sets of characters, an index for indicating from which set of characters the number is to be read, and mechanism controlled by said gear wheel, and including a Geneva-locking device, for shifting said index and locking it in one position to designate a number as represented in characters of one set, whenever said computing wheel of highest denominational order passes through zero in one direction, and for shifting said index and locking it in another position to designate a number as represented in characters of the other set, whenever said computing wheel of highest denominational order passes through zero in the opposite direction.

11. A totalizer comprising, in combination, a set of computing wheels representing different denominational orders, tens-carrying mechanism, including back gearing for transmitting a carry from the computing wheel of highest denominational order to that of lowest denominational order, means controlled by said computing wheels for representing numbers in one or the other of two different sets of characters, an index for indicating from which set of characters the number is to be read, and mechanism controlled by the computing wheel of highest denominational order for shifting said index and locking it in one position to designate a number as represented in characters of one set, whenever said computing wheel of highest denominational order passes through zero in one direction, and for shifting said index and locking it in another position to designate a number as represented in characters of the other set, whenever said computing wheel of highest denominational order passes through zero in the opposite direction, said index-operating mechanism comprising means, including a Geneva-locking device, for connecting said index with a part of said back gearing.

12. A totalizer comprising, in combination, a series of computing wheels representing different denominational orders; tens-carrying mechanism therefor, comprising a transfer element, including an automatic locking device, for each computing wheel of lower denominational order, for carrying from the computing wheel of that order to the computing wheel of next higher denominational order and for locking the same, and back gearing, including automatic locking devices, for carrying from the computing wheel of highest denominational order to the computing wheel of lowest denominational order and for locking the same, said computing wheels, transfer elements and back gearing thus comprising an endless series of normally locked elements; and means for temporarily rendering ineffective the part of said mechanism for carrying to and locking the computing wheel of any denominational order during a computing operation calling for a direct rotation of that wheel.

13. A totalizer comprising, in combination, a series of computing wheels representing different denominational orders; and tens-carrying mechanism therefor, including a gear wheel adjacent the computing wheel of lowest denominational order, a transfer element, including a Geneva-locking device, for each computing wheel of lower denominational order, for effecting a tens-carrying operation from that computing wheel to the computing wheel of next higher denominational order, and for locking the same, back gearing, including a Geneva-locking device, for transmitting rotative motion from the computing wheel of highest denominational order to said gear wheel, and a transfer element, including a Geneva-locking device, for transferring rotative motion from said gear wheel to the computing wheel of lowest denominational order and for locking the same, said computing wheels, transfer elements, and back gearing constituting a closed cycle of normally locked elements, and said transfer elements being movable to ineffective positions, so that the means for carrying to and locking the computing wheel of any denominational order may be rendered ineffective during a computing operation calling for a direct rotation of that wheel.

JULIUS DUCKSTINE.

Witnesses:
ARTHUR A. JOHNSON,
JOHN F. RULE.